United States Patent [19]

Gagnon

[11] Patent Number: 5,423,646
[45] Date of Patent: Jun. 13, 1995

[54] U-NUT

[75] Inventor: Michael G. Gagnon, Oakville, Conn.

[73] Assignee: Buell Industries, Inc., Waterbury, Conn.

[21] Appl. No.: 21,874

[22] Filed: Feb. 24, 1993

[51] Int. Cl.⁶ ............................................. F16B 39/28
[52] U.S. Cl. ..................................... 411/184; 411/174; 411/523
[58] Field of Search ............... 411/112, 184, 175, 174, 411/170, 172, 173, 523, 103, 970, 522, 524

[56] References Cited

U.S. PATENT DOCUMENTS

| | | | |
|---|---|---|---|
| 3,229,743 | 1/1966 | Derby | 151/41.75 |
| 3,426,818 | 2/1969 | Derby | 151/41.75 |
| 4,243,086 | 1/1981 | Kuttler et al. | 411/174 |
| 4,643,610 | 2/1987 | Bien | 403/407 |
| 4,714,392 | 12/1987 | Muller et al. | 411/175 |
| 4,729,706 | 3/1988 | Peterson et al. | 411/175 |
| 4,883,397 | 11/1989 | Dubost | 411/112 X |
| 4,897,005 | 1/1990 | Peterson et al. | 411/175 |
| 5,026,235 | 6/1991 | Muller et al. | 411/523 |

Primary Examiner—Rodney M. Lindsey
Attorney, Agent, or Firm—St. Onge Steward Johnston & Reens

[57] ABSTRACT

A U-nut that is adapted for use with a stand-off fastener to prevent excessive loads on a panel comprises two legs and a joining portion therebetween and an aligned threaded barrel and aperture in the legs. A resilient spring finger follows the contours of the legs and joining portion and does not intersect with a zone between the aperture and barrel. The spring finger will frictionally engage a panel received between the legs of the U-nut.

16 Claims, 2 Drawing Sheets

U-NUT

FIELD OF THE INVENTION

The present invention relates to an improved U-nut which will frictionally mount and be retained on a sheet material, and which is used in securing an object to the sheet material.

DESCRIPTION OF THE PRIOR ART

A U-nut currently used in the automotive industry for securing objects to sheet materials comprises a U-nut having two joined legs between which the sheet material is disposed. Typically, one leg has an aperture, and the second leg has integrally formed thereon a threaded barrel which serves as a nut. A semi-circular tongue extends from the one leg toward the second leg, and frictionally engages the sheet material. The tongue intersects a zone between the barrel and aperture on the two legs. The semi-circular tongue has a circular hole such that a threaded bolt can be passed through the tongue to insert into the threaded barrel of the second leg. This known U-nut is described in U.S. Pat. No. 3,426,818 to Derby for a Yielding Nut Retainer. Another such U-nut or J-nut is described in U.S. Pat. No. 3,229,743 to Derby for a Sheet Metal Nut with Yielding Retainer.

Several improvements to this conventional U-nut have been proposed to address these problems, for example, the U-nuts disclosed in Peterson, U.S. Pat. No. 4,729,706 and in U.S. Pat. No. 4,897,005. However, neither the older nor the improved U-nuts are usable in every situation where a U-nut is desired.

In particular, none of the known U-nuts are usable where a stand-off screw is to be used in combination with the U-nut. Such a stand-off screw is desirable when the U-nut is used with a plastic panel that might fracture if force were applied to the panel. The tongue of prior art U-nuts interferes with the stand-off portion of the screw. In such case, the tongue must be omitted, and consequently the U-nut lacks the ability to be frictionally mounted to the panel prior to fastening with a screw.

SUMMARY OF THE INVENTION

It is an object of the invention to provide an improved U-nut that avoids the problems of the prior art, and which is adapted for use with a stand-off fastener, yet has the desirable features of a U-nut, including ability to frictionally mount to a panel, preferably with a low push-on force. It is an object of the invention that such a U-nut be adapted to mounting to panels of a range of thicknesses without substantial variance in the effectiveness of the U-nut. It is an object of the invention to provide such a U-nut that lacks sharp protrusions that could damage the panel.

A U-nut in accordance with one embodiment of the invention comprises a first leg having a threaded barrel, a second leg having an aperture, and a spring finger for frictionally engaging with a panel located in a bridge joining the two legs. The spring finger extends from one leg around the bridge and into the other leg. In a preferred embodiment, the spring finger is generally shaped to conform with the cross-sectional shape of the legs and bridge, and extends integrally from a joining point with the second leg located between the aperture and the bridge, to a free end located at the first leg between the barrel and bridge. The spring finger does not intersect a zone between the barrel and the aperture so that there is no interference with a stand-off fastener. Preferably, the spring finger is cutaway from the legs and bridge. The length of the spring finger is sufficient to give the spring finger desirable sufficient spring characteristics to provide a low push-on force. An inner face of the first leg is provided with a square edge around the barrel opening to receive the shoulder of a stand-off fastener so that the combination of fastener and U-nut provides a U-nut with a selected gap width between the U-nut legs.

Other objects, aspects and features of the present invention in addition to those mentioned above will be pointed out in or will be understood from the following detailed description provided in conjunction with the accompanying drawings.

DETAILED DESCRIPTION OF THE PREFERRED EMBODIMENT

Figure 1:
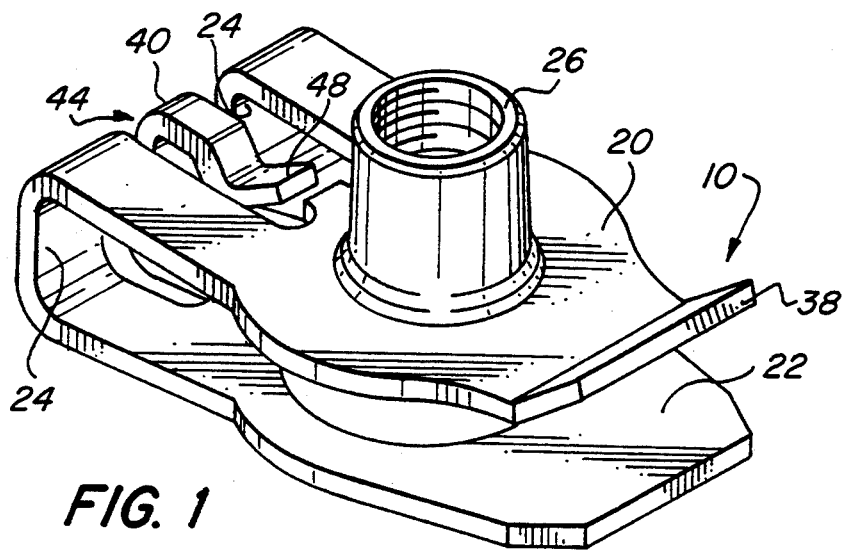
FIG. 1 is a perspective view of an embodiment of an improved U-nut in accordance with the invention.
Figure 4:
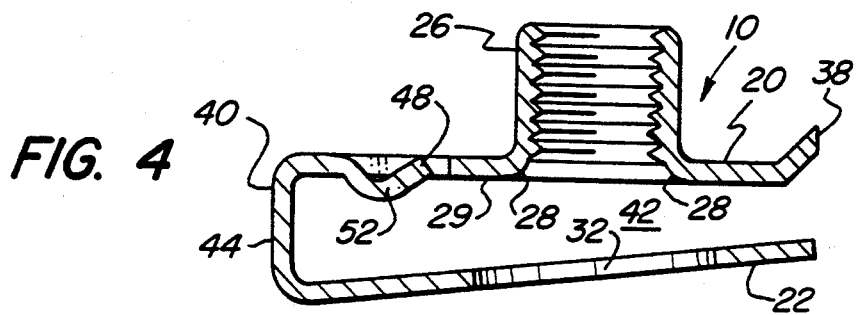
FIG. 4 is a cross-sectional view along the line 4—4 of FIG. 3.
Figure 2:
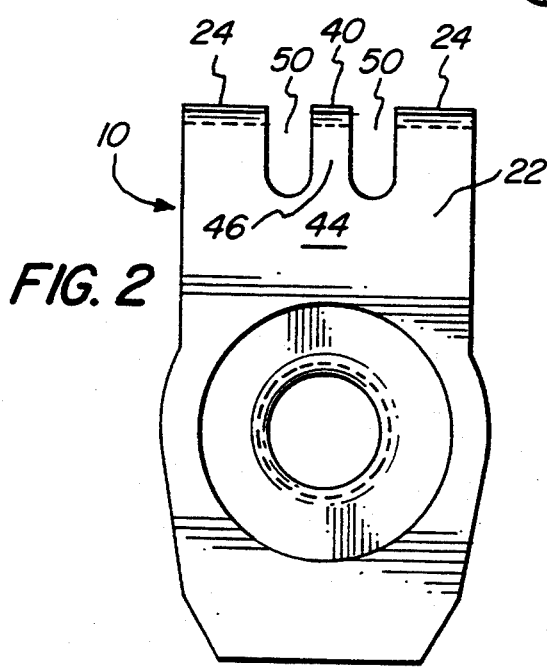
FIG. 2 is a bottom plan view of the embodiment of the U-nut of FIG. 1.
Figure 3:
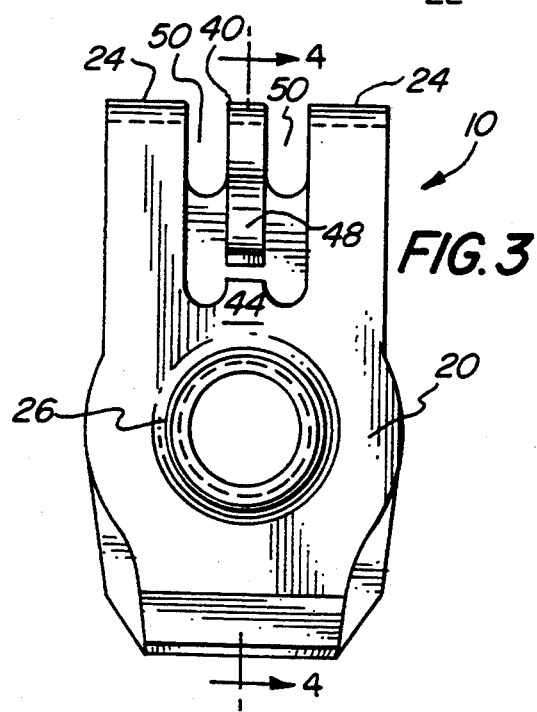
FIG. 3 is a top plan view of the embodiment of the U-nut of FIG. 1.

Referring now to FIGS. 1–6, where like numerals indicate like elements in the drawings, an improved U-nut 10 in accordance with one embodiment of the invention is shown. U-nut 10 comprises a first leg 20, a second leg 22, and a bridge 24 joining legs 20 and 22, and a spring finger 40 in the area of the bridge 24.

First leg 20 has an internally threaded barrel 26 integrally formed with leg 20. Barrel 26 is a drawn tube that extends outwardly from the leg 20. Barrel 26 preferably has a squared edge 28 about opening 30 in inner face 29 in leg 20 where barrel 26 joins leg 20.

Figure 6:
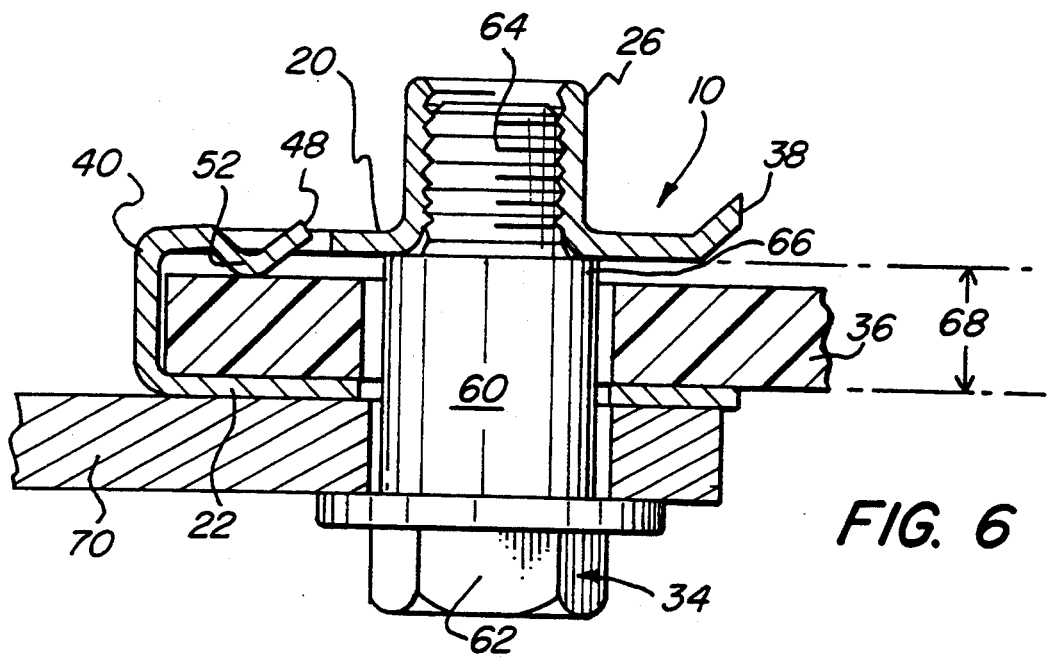
FIG. 6 is a cross-sectional view of a U-nut of FIG. 5 showing a fastener secured to the U-nut.

Second leg 22 has an aperture 32 which is axially aligned with barrel 26 whereby a fastener 34 may be inserted through aperture 32 and matingly threaded together with barrel 26, as shown in FIG. 6.

Figure 5:
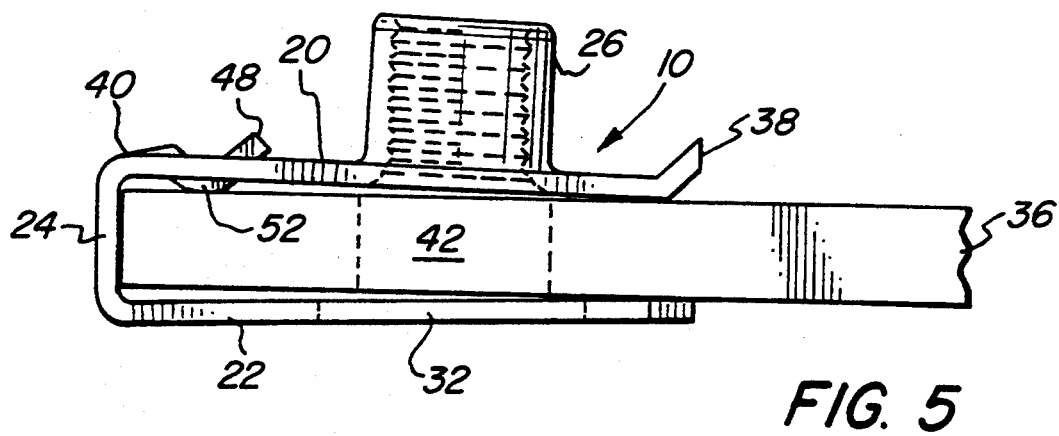
FIG. 5 is a side elevation view of the U-nut of FIG. 1 showing the U-nut mounted to a panel.

Preferably, first leg 20, the second leg 22, and bridge 24 comprise generally planar bodies, whereby U-nut 10 comprises a series of flat elements with the features as discussed herein. The legs 20 and 22 are separated to receive a panel 36 therebetween, as shown in FIGS. 5 and 6.

Preferably, first leg 20 has an outwardly angled leading edge 38 to improve the ease of mounting of U-nut 10 to panel 36 by providing the U-nut 10 with a guide to make it self-aligning with the panel 36 when the U-nut is mounted to panel 36.

Spring finger 40 is non-intersecting with the zone 42 extending between the aperture 32 and the threaded barrel 26. The non-intersection of the spring finger 40 with zone 42 makes the U-nut 10 of the invention suitable for use with a stand-off fastener 34, as set forth in more detail hereafter. Spring finger 40 frictionally engages panel 36 located between the legs 20 and 22 to retain U-nut 10 to panel 36.

Spring finger 40 preferably is located in a center portion 44 of the legs 20 and 22 and bridge 24. The location of the spring finger in the bridge 24 joining the two legs 20 and 22 permits the spring finger 40 to be operable on panel 36 without intersection with the zone 42.

Spring finger 40 is generally shaped to conform with the cross-sectional shape of the first and second legs 20 and 22 and bridge 24. Preferably, spring finger 40 extends integrally from a joining point 46 of the spring finger 40 with the second leg 22. The joining point 46 is preferably located between the aperture 32 and the bridge 24. Spring finger 40 preferably extends to a free end 48 located at the first leg 20 between the barrel 26 and bridge 24.

Portions of the first leg 20, bridge 24 and second leg 22 adjacent the spring finger 40 are cutaway to provide a clearance 50 between spring finger 40 and the first and second legs 20 and 22 and bridge 24. This enhances the spring resilience of spring finger 40.

Spring finger 40 has a total length selected to provide the spring finger 40 with spring characteristics selected to give the U-nut 10 a low push-on force in mounting the U-nut 10 to panel 36. It is to be appreciated that it is the entire length of the spring finger 40, not just the portion of the spring finger 40 in the plane of leg 20, which contributes to the desired low push-on force. As described with reference to the preferred embodiment of the drawings, the desired length is achieved by forming the spring finger 40 so that it follows the contours of the U-nut 10. This achieves the desired result of a long "spring arm" combined with a neatly packaged assembly in which the spring finger 40 does not interfere with the use of a stand-off fastener 34.

Preferably, the free end 48 of finger 40 is provided with an inwardly extending lip 52. The lip 52 will frictionally engage with a panel inserted between the legs 20 and 22 of U-nut 10, as shown in FIG. 5. If panel 36 is provided with a detent or slot in the appropriate location, lip 52 will drop and seat in the detent. Such a detent arrangement is useful to locate the U-nut at a particular position in the panel and may improve alignment of the U-nut with a panel aperture.

The U-nut of the invention eliminates sharp edges that can gouge the panel or protective coatings. This is desirable both with metal and plastic panels to protect the integrity of the panel yet still provide a U-nut that can frictionally mount to the panel. The lip 52 of U-nut is preferably as shown with a relatively broad flat tapered area that permits the U-nut to be smoothly mounted to a panel.

As noted, the spring finger 40 does not intersect zone 42 between the barrel 26 and the aperture 32. Consequently, as shown in FIG. 6, a stand-off fastener 34 having a larger diameter section 60 adjacent a head 62 and a smaller diameter section 64 adjacent the larger diameter section 60 can be used with U-nut 10. The smaller diameter section 64 is threaded to mate with the threaded barrel 26. A shoulder 66 is located between the larger and smaller diameter sections 60 and 64. Shoulder 66 abuts and is received by the squared edge 28 of the inner face 29 of the first leg 20 when the fastener 34 is secured together with the threaded barrel 26 of the U-nut 10. The shoulder 66 of the stand-off fastener 34 seats against the inner face 29 and thus limits the gap 68 between the legs 20 and 22 to a selected gap width. The selected gap width will be determined by the length of larger diameter section 60 or shank of the fastener 34.

The consistent gap width prevents excess compression on the panel 36 to prevent distortion, warping and fracturing that can occur when panel 36 is a plastic panel that is susceptible to damage when subject to large compressive loads.

As seen in FIG. 6, the U-nut 10 can thus be used in combination with fastener 34 to secure panel 36 to another object such as another panel 70 or a framework.

The present invention therefore provides a U-nut with a desirable low push-on force and the ability to be frictionally mounted to a panel. The U-nut also permits the use of a stand-off fastener with the U-nut to avoid excess compressive force on a panel onto which the U-nut is mounted.

It is to be appreciated that the foregoing is illustrative and not limiting of the invention, and that various changes and modifications to the preferred embodiments described above will be apparent to those skilled in the art. Such changes and modifications can be made without departing from the spirit and scope of the present invention, and it is therefore intended that such changes and modifications be covered by the following claims.

What is claimed is:

1. A U-nut, comprising:
   a first leg having means for securing to a fastener thereon;
   a second leg having an aperture therein, said aperture being axially aligned with said securing means;
   a bridge joining said first and second legs;
   a spring finger located in said legs and bridge, and which extends integrally from a joining point of said spring finger with one of said legs to a free end located at the other of said legs, said joining point and free end being located on the portions of the legs between said securing means and bridge and between said aperture and said bridge.

2. A U-nut in accordance with claim 1, wherein said spring finger has a sufficient length to allow the spring characteristics of said spring finger to be selected to provide said spring finger with a selected low push-on force in mounting said U-nut to a panel.

3. A U-nut in accordance with claim 2, wherein said spring finger extends from a joining point on said second leg to a free end in said first leg.

4. A U-nut in accordance with claim 3 wherein said first leg, said second leg, and said bridge comprise generally planar bodies.

5. A U-nut in accordance with claim 4 wherein said spring finger is generally shaped to conform with said first leg, said bridge and said second leg.

6. A U-nut in accordance with claim 5 wherein portions of said first leg, bridge and second leg adjacent said spring finger are cutaway to provide a clearance between said spring finger and said first and second legs and bridge.

7. A U-nut in accordance with claim 6 wherein said free end of said spring finger is provided with an inwardly extending lip.

8. A U-nut in accordance with claim 7 wherein said first leg has an outwardly angled leading edge.

9. A U-nut, comprising:
   a first leg having a threaded barrel thereon;
   a second leg having an aperture therein, said aperture being axially aligned with said barrel;
   a bridge joining said first and second legs;
   a spring finger located in a center portion of said legs and bridge, and which is generally shaped to conform with the cross-sectional shape of said first and second legs and said bridge, and extends integrally from a joining point of said spring finger with said second leg located between said aperture and said bridge, to a free end located at the first leg between said barrel and bridge, whereby said spring finger does not intersect a zone between said barrel and said aperture, portions of said first leg, bridge and second leg adjacent said spring finger being cut-away to provide a clearance between said finger and said first and second legs and bridge, said spring finger having a length selected to provide said spring finger with spring characteristics selected to give said U-nut a low push-on force in mounting said U-nut to a panel.

10. A U-nut in accordance with claim 9 wherein said first leg, said second leg, and said bridge comprise generally planar bodies.

11. A U-nut in accordance with claim 10 wherein said free end of said spring finger is provided with an inwardly extending lip.

12. A U-nut in accordance with claim 11 wherein an inner face of said first leg is provided with a square edge around an opening of said barrel in said first leg.

13. A U-nut in accordance with claim 12 wherein said first leg has an outwardly angled leading edge.

14. A combination comprising:
a U-nut having
two joined legs, a first leg having a threaded barrel and a second leg having an aperture aligned with said barrel, said legs being separated to receive a panel there between, and
a spring finger located in a joining portion between said two legs, said spring finger being non-intersecting with the zone between said aperture and said threaded barrel, said spring finger being adapted to frictionally engage a panel located between said legs; and
a stand-off fastener having a larger diameter section adjacent a head and a smaller diameter section adjacent said larger diameter section, said smaller diameter section being threaded to mate with said threaded barrel, a shoulder being located between said larger and smaller diameter sections, said shoulder abutting an inner face of said first leg when said fastener is secured together with said threaded barrel of said U-nut to limit a gap between said legs to a selected gap width.

15. A combination in accordance with claim 14, wherein said spring finger is generally shaped to conform with the cross-sectional shape of said first and second legs and said joining portion therebetween.

16. A combination in accordance with claim 15 wherein said inner face of said first leg is provided with a squared edge around an opening of said barrel in said first leg to receive said shoulder of said stand-off fastener.

* * * * *